Jan. 9, 1951 P. G. DRONG 2,537,400
CONTROL MEANS FOR MULTIPLE DRIVEN-AXLE VEHICLES
Filed Jan. 28, 1948 2 Sheets-Sheet 1
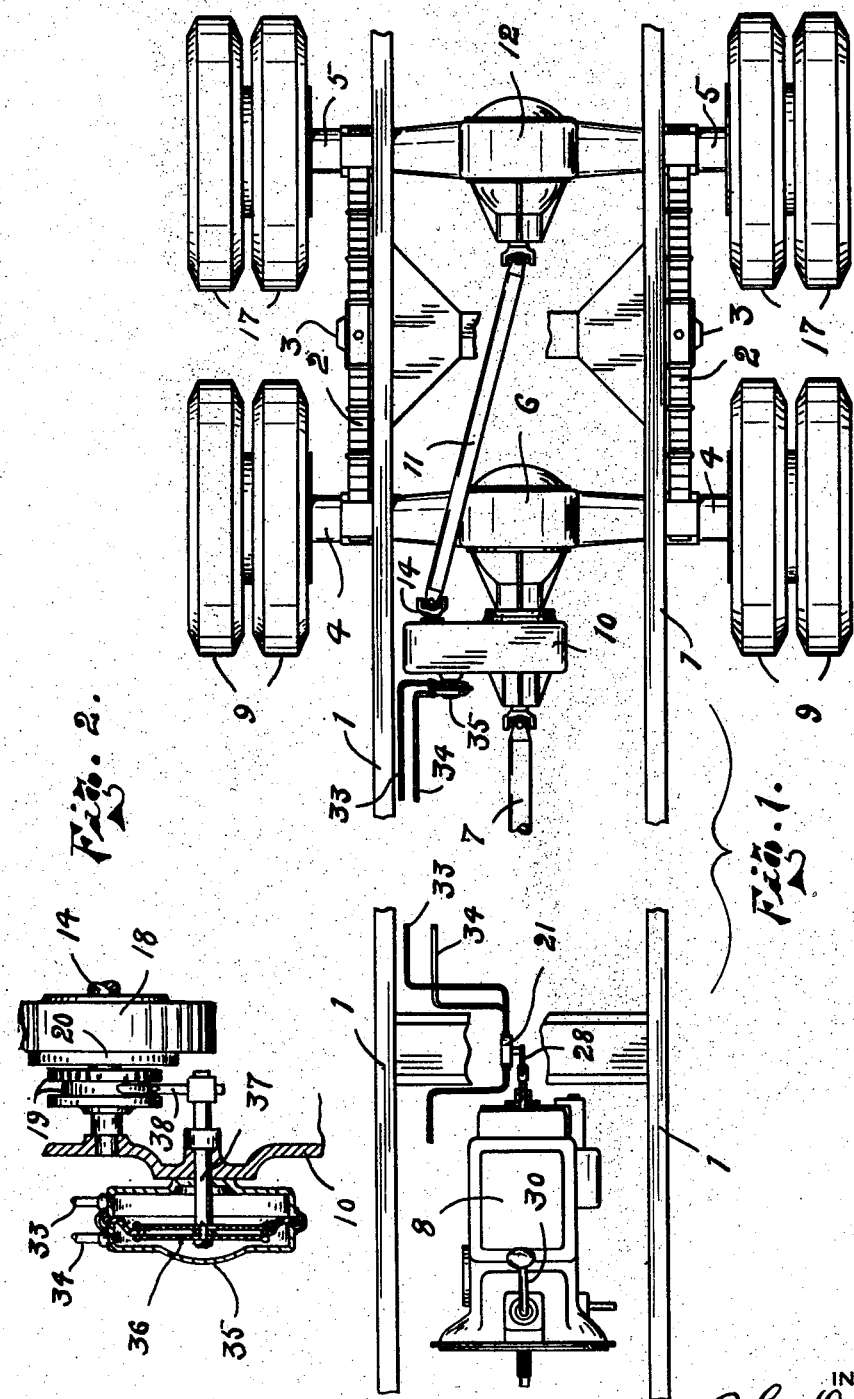
INVENTOR
P. G. Drong.
BY Geo Stevens
ATTORNEY Jan. 9, 1951 P. G. DRONG 2,537,400
CONTROL MEANS FOR MULTIPLE DRIVEN-AXLE VEHICLES
Filed Jan. 28, 1948 2 Sheets-Sheet 2
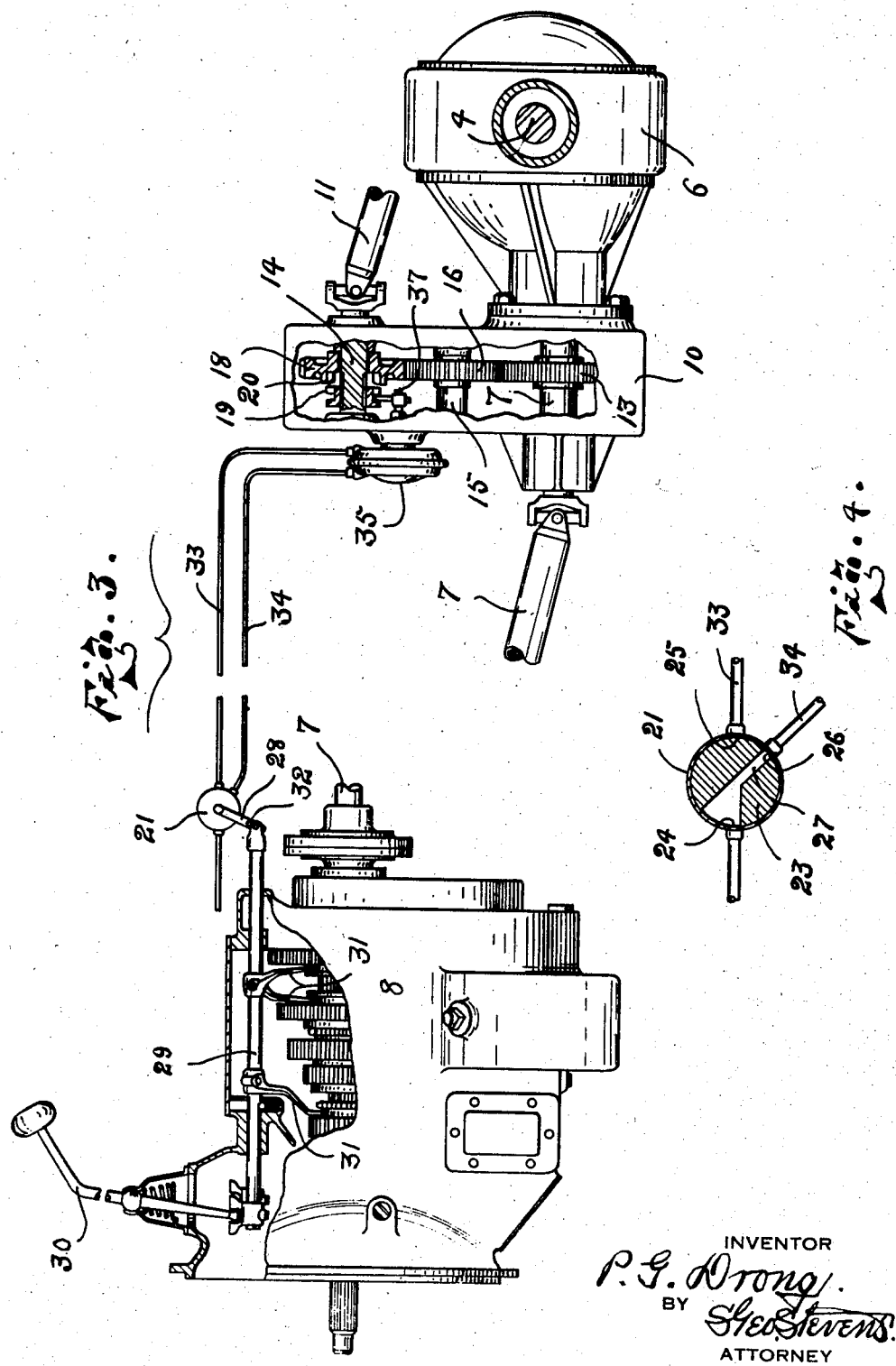
INVENTOR
P. G. Drong.
BY Geo. Stevens.
ATTORNEY Patented Jan. 9, 1951

2,537,400

UNITED STATES PATENT OFFICE 2,537,400

CONTROL MEANS FOR MULTIPLE DRIVEN AXLE VEHICLES

Peter G. Drong, Hibbing, Minn.

Application January 28, 1948, Serial No. 4,826

8 Claims. (Cl. 180—22)

This invention relates to power transmission means and has special reference to such in relation to motor vehicles which have two or more powered axles.

It is well known that motor vehicles, trucks particularly, are being built with auxiliary powered axles in addition to the one usual powered axle, the object being to provide more traction and power for pulling over bad roads or for hauling heavy loads. Invariably these extra powered axles are a drawback or hindrance when on the highway where going is good and speed can be obtained or where there is no heavy load on the vehicle and there is no need for the added traction and power.

Also, it is well known that mechanical means have been provided for selectively shifting the auxiliary powered axles to so-called "trailing axles" or un-powered axles. The shifting of the auxiliary axle has always depended on the discretion of the driver who operates the shifting lever. This latter feature has resulted in drivers sometimes forgetting or neglecting to shift the auxiliary axles into operation when road conditions so required and has resulted in overloading the main or principal axle and gears to a point of excessive wear and strain if not actual breakage. In addition, drivers often neglect to shift the auxiliary axles out of operating position upon reaching the highways or after unloading their vehicles thereby providing excessive wear on the power mechanism of the auxiliary axles as well as requiring greater fuel consumption to propel the vehicle, all of which, when added up, present a great problem and expense to truck owners.

To overcome these disadvantages and provide for automatic control of the auxiliary axles is the principal object of the instant invention.

Another object is to provide such control means in as simple and inexpensive a manner as possible.

A more specific object is to provide, through a shifting mechanism or unit, a means of operating an auxiliary axle from the transmission of a vehicle whereby the said axle will be automatically shifted to the proper operating position.

These and other objects and advantages will become more apparent as the description of the invention proceeds.

In the accompanying drawing forming a part of this application:

Fig. 1 is a broken top plan view of a vehicle showing the invention as applied thereto.

Fig. 2 is an enlarged broken sectional view of the shifting unit and a portion of the transfer case.

Fig. 3 is a broken sectional view of a portion of a vehicle transmission and the transfer case, the invention being operatively applied thereto.

Fig. 4 is a central vertical sectional view through the vacuum control for the shifting arrangement showing its connections in elevation.

In the drawing, the reference numeral 1 indicates the frame or chassis of a truck. A spring 2 is suitably secured to a longitudinal member of the chassis 1 as at 3, on each side thereof, and at each lower or outer end of the springs 2 the main powered axle and the auxiliary axle, 4 and 5 respectively, are carried. The main axle 4 is constantly connected through the differential 6 and drive shaft 7 to the transmission 8 and supplies driving power to the wheels 9, while the auxiliary axle 5 has a selectively engageable connection to the drive shaft 7 through the transfer case 10, the auxiliary drive shaft 11, and the differential indicated at 12 which is a duplicate of the differential 6.

The drive shaft 7 extends through the transfer case 10 and into the differential 6, but has fixed thereon within the transfer case 10 a gear 13 which is rotated therewith. Above the gear 13 and journalled within suitable bearings in the transfer case is an intermediate shaft 15 which is parallel with the portion of the drive shaft 7 immediately therebelow and carries thereon an intermediate or idler gear 16 which is constantly meshed with and rotated by the gear 13 when the drive shaft 7 is rotating.

A portion 14 of the auxiliary drive shaft 11 extends into the proper portion of the transfer case 10 and is suitably journalled at each end thereof, this portion of the shaft 11 being parallel with the shaft 15 and the portion of the drive shaft 7 which extends through the transfer case. It is deemed apparent that the auxiliary shaft 11 will be rotated when the vehicle is in motion by the rotation of the wheels 17 which rotate the auxiliary axle 5, and through the differential 12 will rotate the auxiliary drive shaft, the speed of rotation of the shaft 11 will be the same as that of the shaft 7, provided, of course, that the wheels 9 and 17 and the differentials 6 and 12 are alike.

To effect a driving connection for the auxiliary shaft 11 from the main drive shaft 7, a gear 18, of the same size as the gear 13, is rotatably carried on the portion 14 of the shaft 11 which extends within the transfer case, and is constantly meshed with the gears 13 and 16. There is a small gear 19 slidably splined to the shaft 14 adjacent the gear 18, and it is selectively engageable with the internal gear 20 which is a part of the gear 18. The gears 18 and 20 are, of course, travelling at the same speed at all times being driven by the intermediate gear 16 and the gear 19 is travelling at the same speed as the gears 18 and 20 due to its being driven by the wheels 17 of the trailing axle assembly through the differential 12 and auxiliary drive shaft 11. The slidable splining of the gear 19 to the shaft 11 is such that the same may be held either in mesh with the internal gear 20 or out of mesh therewith according to the power needs of the vehicle.

It is deemed apparent that the intermediate gear 16 will tend to rotate the shaft 11 at the same speed as the shaft 7 is rotating when the small gear 19 is in mesh with the internal gear 20 and thereby equal power is transmitted to both axles and sets of wheels. Also, when the gear 19 is not in mesh with the gear 20, the intermeshing of the gears may be readily accomplished due to their being continuously rotated at the same relative speeds while the vehicle is in motion, thus making the intermeshing of the gears a simple matter of moving them into engagement.

To accomplish the objects of the instant invention, the shifting of the gear 19 into engagement with the gear 20 must be automatic and not dependent upon the driver's memory or choice, the same being true in regards to the disengagement of gears 19 and 20.

A selector switch such as the vacuum control 21 is suitably supported on the housing of the transmission 8. This control comprises an external housing with an oscillatory valve 23 installed therein. There is a vacuum inlet port 24 which leads to any source of power, in the instant application a source of vacuum, which may be supplied by the motor or engine of the vehicle itself, and two outlets 25 and 26. The valve 23 has a suitable opening or passage 27 therethrough with an enlarged portion which is in communication with the inlet 24 at all times, the rotation or oscillation of the valve 23 being limited to that extent. The narrow portion of the passage 27 is of the same relative size as the outlet ports 25 and 26 and the entire control or selector switch is so arranged that the oscillation or rotation of the valve 21 is such that when same is in one extreme position a complete or through passage is provided only from the inlet 24 through the outlet 25 and when in the opposite extreme position a through passage is provided only from the inlet 24 through the outlet 26, and the source of power is thereby controlled to be directed through either one of the outlets 25 or 26.

The movement of the valve 23 is controlled or accomplished by means of a suitable crank arm 28 which has one end fixed to the valve 23 which has a shaft externally of the housing.

Within the normal transmission of vehicles is a reciprocable shaft or rod 29 which is operated by the shifting lever 30 to shift the transmission into or out of high gear, there being a suitable fork or forks 31 fixed to the rod 29 to accomplish the movement of the gears within the transmission. (There is, of course, another or other reciprocable rods similar to the rod 29 to affect the shifting of the transmission into other gears, but in the instant invention we are merely interested in the one rod 29.) The rod 29 is extended on one end so that it protrudes from the transmission housing and has its outer end pivotally secured to the crank arm 28, there being a suitable slot 32 in the arm 28 to permit of the rod 29 operating the crank arm as it is reciprocated when the transmission is shifted into or out of high gear by the shifting lever 30.

The arrangement of the valve, crank arm, and the shifting thereof by the rod 29 is such that only when the transmission is shifted into or out of high gear will there be any shifting of the valve to divert the source of power from one outlet port to the other.

Leading from each outlet port 25 and 26 is a line of tubing, 33 and 34 respectively, which terminates adjacent the transfer case 10 and are connected to a power shift unit indicated at 35 which in this instance is vacuum operated. This unit comprises a housing, a diaphragm 36 which is mounted centrally thereof, and an operating shaft or rod 37 which is connected to and operated by the movement of the diaphragm. The diaphragm is moved by means of the vacuum source which is controlled by the switch 21 adjacent the transmission, and directed to the unit 35 by means of the tubes 33 and 34, one of the tubes being operatively connected to the unit on each side of the diaphragm. When the vacuum is created on one side of the diaphragm the latter is moved in that direction bringing the rod 37 therewith, and vice versa.

The operating rod 37 forms a part of the unit 35 and is connected to the diaphragm at one end thereof so as to be reciprocated therewith while the opposite end of the rod extends through the housing of the transfer case to a point adjacent the small sliding gear 19. A shifting fork or prong 38 is fixed to the end of the rod 37 and engages a portion of the sliding gear 19 whereby same may be operated and controlled by the shifting unit 35, and the gear moved into or out of mesh with the internal gear 20 to either make or break the driving connection of the rear pair of wheels 17 to the main drive shaft.

In operation, the auxiliary axle 5 is powered at all times except when the transmission is in high gear, and the shifting of the transmission into high gear automatically shifts the sliding gear in the transfer case to disconnect the auxiliary drive shaft 11 so that the auxiliary axle becomes a trailing axle. Similarly, the shifting of the transmission out of high gear shifts the sliding gear in the transfer case to connect the auxiliary drive shaft to the main drive shaft and the axle 5 becomes a powered axle and remains such in all of the lower transmission speeds.

It is deemed apparent that I have devised a system of controlling one axle of a tandem rear end of a vehicle which is automatic and which is not dependent upon the driver's memory or choice, but which will automatically function as designed to function under all conditions and circumstances, thereby eliminating unnecessary wear and tear on the main driving axle when power is needed, as well as on the trailing axle when speed is desired.

While I have here shown a plurality of gears mounted on the portion 14 of the auxiliary drive shaft 11, it is deemed apparent that one sliding gear on said shaft adapted to be meshed with the intermediate gear 16 by means of the shifting unit 35 could be employed without departing from the spirit of the invention.

Having thus described my invention, what I claim is:

1. Means to automatically accomplish a driving connection and disengage said driving connection of the auxiliary drive shaft of a vehicle to the main drive shaft and transmission thereof comprising a source of power, a switching device to divert said source of power, a transfer case having a plurality of gears intermediate said auxiliary drive shaft and said main drive shaft and driven by the latter to selectively drive the former, a shifting device installed adjacent said transfer case, one of the gears within said case having a connection to and being movable by said shifting device to effect the disconnection and connection of said main drive shaft to said auxiliary drive shaft, means connecting said switching device to said shifting device to operate same by said source of power, and said transmission having a member therein which reciprocates when said transmission is shifted into and out of high gear, said switching device being connected to and operated by said member in said transmission to divert said source of power so that said movable gear in said transfer case is moved by said shifting device.

2. The structure as set forth in claim 1 and said switching device comprising a valve to divert said source of power, and said shifting device having a reciprocable diaphragm operable by said source of power, and an operating rod connected from said diaphragm to said member in said transfer case.

3. In a vehicle having a source of power, a main drive shaft, an auxiliary drive shaft, a transfer case having a plurality of gears intermediate said shafts to interconnect same, a transmission connected to said main drive shaft and having a member therein which reciprocates when said transmission is shifted into and out of high gear; the combination of a switching device connected to and operable by said reciprocable member of said transmission to control said source of power, a shifting device operated by said source of power and connected to and controlled by said switching device, one of the gears within said transfer case being connected to and movable by said shifting device to effect the connection and disconnection of said auxiliary shaft to said main drive shaft when said transmission is shifted out of and into high gear respectively.

4. The structure as set forth in claim 3 and said source of power comprising a suction, said switching device comprising a valve to divert said suction, said shifting device having a suction actuated diaphragm, and an operating rod connected from said diaphragm to said movable gear in said transfer case.

5. The structure as set forth in claim 3 and said shifting device comprising a housing, a reciprocable shaft extending from said housing into said transfer case and being connected to said movable gear within said case, and means within said housing to reciprocate said shaft.

6. Means to automatically accomplish a driving connection, or disengage said driving connection, of the auxiliary drive shaft of a vehicle to the main drive shaft and transmission thereof, said auxiliary drive shaft and main drive shaft being connected by gears within a transfer case, comprising: a source of power, a switching device to divert said power source, said transmission having a shaft connected to said switching device for operating the latter only when said transmission is shifted into and out of high gear, a shifting device adjacent said transfer case, one of the gears within said transfer case being a sliding gear and having a connection to said shifting device and being movable by the latter to accomplish said connection and disengage same, and means connecting said switching device to said shifting device, said switching device serving to divert said source of power to operate said shifting device in accordance with the shifting of said transmission.

7. The structure as set forth in claim 6 and said shifting device comprising a housing, a reciprocable shaft extending from said housing into said transfer case and being connected to said movable gear within said case, and means within said housing to reciprocate said shaft.

8. In combination with a vehicle having a transmission, a source of power, a pair of tandem axles, one of said axles being a main powered axle and the other being an auxiliary powered axle, a drive shaft operatively connected to said transmission at one end and at the other end to said main powered axle, a transfer case carried adjacent said main powered axle and having a plurality of gears therein driven from said drive shaft, and an auxiliary drive shaft operatively connected from said drive shaft through the gears of said transfer case to said auxiliary powered axle, said transmission having a shaft which reciprocates when said transmission is shifted into and out of high gear: means to automatically accomplish the connection and disconnection of said auxiliary shaft and auxiliary axle from said main drive shaft when said transmission is shifted into and out of high gear comprising a selector switch operated by said reciprocable shaft to divert said source of power, a shifting unit carried adjacent said transfer case, means connecting said switching device to said shifting unit to operate the latter, and one of the gears within said transfer case being a sliding gear having a connection to said shifting unit and being movable by the latter to accomplish the said connection and disconnection in accordance with the shifting of said transmission.

PETER G. DRONG.

REFERENCES CITED

The following references are of record in the file of this patent:

UNITED STATES PATENTS

| Number | Name | Date |
| --- | --- | --- |
| 1,927,276 | Bryan | Sept. 19, 1933 |
| 2,329,916 | Lamb | Sept. 21, 1943 |
| 2,341,883 | Sloan | Feb. 15, 1944 |
| 2,352,301 | Welles | June 27, 1944 |
| 2,365,732 | Snow | Dec. 26, 1944 |
| 2,445,716 | Sternberg | July 20, 1948 |
| 2,450,214 | Ware | Sept. 28, 1948 |